United States Patent
Damania et al.

(10) Patent No.: US 11,080,705 B2
(45) Date of Patent: Aug. 3, 2021

(54) TRANSACTION AUTHENTICATION USING VIRTUAL/AUGMENTED REALITY

(71) Applicant: Bank of America Corporation, Charlotte, NC (US)

(72) Inventors: Vibhuti Damania, Carollton, TX (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 76 days.

(21) Appl. No.: 16/191,715

(22) Filed: Nov. 15, 2018

(65) Prior Publication Data
US 2020/0160345 A1 May 21, 2020

(51) Int. Cl.
| | |
|---|---|
| *G06Q 20/40* | (2012.01) |
| *G06F 21/32* | (2013.01) |
| *G06T 13/40* | (2011.01) |
| *G06T 19/00* | (2011.01) |
| *G06K 9/00* | (2006.01) |

(52) U.S. Cl.
CPC ....... *G06Q 20/40145* (2013.01); *G06F 21/32* (2013.01); *G06K 9/00221* (2013.01); *G06T 13/40* (2013.01); *G06T 19/006* (2013.01)

(58) Field of Classification Search
CPC .............. G06Q 20/40145; G06F 21/32; G06K 9/00221; G06T 13/40; G06T 19/006
See application file for complete search history.

(56) References Cited

U.S. PATENT DOCUMENTS

| | | | |
|---|---|---|---|
| 7,962,644 B1 * | 6/2011 | Ezerzer | H04M 3/5191 370/352 |
| 8,438,110 B2 | 5/2013 | Calman et al. | |
| 9,985,786 B1 | 5/2018 | Bhabbur et al. | |
| 10,157,504 B1 * | 12/2018 | Jain | G06T 11/60 |
| 10,395,484 B2 * | 8/2019 | Blair | G06Q 20/1085 |
| 10,540,491 B1 * | 1/2020 | Martinez | G06F 21/36 |
| 10,586,220 B2 * | 3/2020 | Adams | G06F 1/163 |
| 2005/0068567 A1 * | 3/2005 | Hull | H04N 1/00291 358/1.15 |

(Continued)

FOREIGN PATENT DOCUMENTS

| | | | |
|---|---|---|---|
| EP | 3528156 A1 * | 8/2019 | ......... G06Q 20/3821 |
| WO | WO2016/141014 | 9/2016 | |

OTHER PUBLICATIONS

Nahla Khalil, The 3D virtual environment online for real shopping, Dec. 8, 2015, ARXIV.org, 1-7 (Year: 2015).*

*Primary Examiner* — Hani M Kazimi
*Assistant Examiner* — Alison L. Lamb
(74) *Attorney, Agent, or Firm* — Weiss & Arons LLP; Michael A. Springs, Esq.

(57) ABSTRACT

Apparatus and methods for authenticating a proxy for executing a transaction on behalf of a customer. The authentication may be based at least in part on the movement of a three-dimensional object in space. The object may have a plurality of faces. Movement of the object may be tracked by a camera. The method may comprise receiving, from a first set of processors, a first two-dimensional pattern, a second two-dimensional pattern, a third two-dimensional pattern and a sequence for presenting the first, second and third pattern. The method may also comprise tracking, using a camera, the movement of the object in space. The method may further comprise capturing, using the camera, a first face, a second face and a third face of the object presented to the camera and recording, using the camera, a sequence in which the faces were presented to the camera.

19 Claims, 4 Drawing Sheets

(56) References Cited

U.S. PATENT DOCUMENTS

| | | |
|---|---|---|
| 2012/0124655 A1 | 5/2012 | Valin et al. |
| 2016/0358181 A1* | 12/2016 | Bradski .................. G06F 3/011 |
| 2017/0262855 A1 | 9/2017 | Venugopalan et al. |
| 2018/0109510 A1 | 4/2018 | Tommy et al. |
| 2018/0114221 A1 | 4/2018 | Karantzis |
| 2018/0139203 A1* | 5/2018 | Dolan ..................... G06F 21/32 |
| 2018/0150844 A1 | 5/2018 | Dolan et al. |
| 2018/0157820 A1 | 6/2018 | Adams et al. |
| 2018/0158053 A1 | 6/2018 | Adams et al. |
| 2018/0158060 A1* | 6/2018 | Adams .................... G07F 19/20 |
| 2018/0189759 A1 | 7/2018 | Bhuiya et al. |
| 2018/0204196 A1 | 7/2018 | Licht et al. |
| 2018/0285538 A1* | 10/2018 | Zhu ......................... G06F 21/36 |
| 2019/0012735 A1* | 1/2019 | Mehew ................. G06Q 20/322 |
| 2019/0122045 A1* | 4/2019 | Ravi .................. G06K 9/00228 |
| 2019/0147156 A1* | 5/2019 | Burri .................. G06K 9/00597 |
| | | 713/186 |
| 2019/0188788 A1* | 6/2019 | Baker, IV ................ H04L 67/38 |
| 2020/0117788 A1* | 4/2020 | Mohammad ....... G06K 9/00335 |

* cited by examiner https://xxx.xxxxxx.xxx/

Welcome! Please input data into the following fields to customize the authentication of your proxy using VIRTUAL REALITY to execute a transaction, receive funds or assist in creating a multi-part token on your behalf.

| Name | Address | Phone Number | E-mail |
|---|---|---|---|
|  |  |  |  |

| Hair Color | Height | Eye Color | Hair Length |
|---|---|---|---|
|  |  |  |  |

205

The Avatar will be presented with options. Please select which options the Avatar must perform for authentication, and the order in which the actions must be performed.

| Order | | Order | | Order | |
|---|---|---|---|---|---|
| Pick up coin | | Chop down tree | | Open box | |
| Open treasure box | | Put on hat | | Go to sleep | |
| Shoot horse | | Pick up boot | | Pick up treasure | |
| Put on cape | | Fly to moon | | Take off shoe | |

FIG. 2

TRANSACTION AUTHENTICATION USING VIRTUAL/AUGMENTED REALITY

FIELD OF TECHNOLOGY

Aspects of the disclosure relate to providing apparatus and methods for authenticating a transaction based at least in part on the use of virtual and/or augmented reality. Aspects of the disclosure also relate to providing apparatus and methods for remotely authenticating a proxy based at least in part on the proxy's use of augmented reality and/or virtual reality.

BACKGROUND

Legacy passwords and authentication codes typically require the input of numbers, letters and/or symbols to form an authentication code. The numbers and letters available to the user to create the code are limited to the numbers, letters and symbols displayed on a keyboard or pad. It would be desirable, therefore, to provide systems and methods for enabling a user to create a password that includes actions that are different from the legacy numbers, letters and symbols. Furthermore, it typically is difficult for a user to remember a password that includes a meaningless string of numbers, letters and symbols. It would be further desirable, therefore, to provide systems and methods for enabling a user to create a dynamic password that is engaging for the user and easy to remember.

Augmented reality and virtual reality are being increasingly used for both entertainment and business purposes. Both augmented reality and virtual reality include an almost limitless number of actions that can be performed by the user within the augmented/virtual reality. Furthermore, augmented and virtual reality create engaging and exciting realities for a user that can be easily remembered and repeated at a later point in time.

It would be desirable, therefore, to provide apparatus and methods for using augmented and/or virtual reality for creating a user password. It would also be desirable to provide apparatus and methods for using augmented and/or virtual reality to authenticate a transaction based on actions performed by a user while using the augmented/virtual reality.

An individual may be presented with the need to authenticate a proxy for carrying out one or more functions, such as financial transactions, on his behalf. Remote authentication of a proxy can be difficult, especially when the individual is not present to verify that the person presenting himself as the proxy is, in fact, the person that he desires to be her/his proxy. It would be further desirable to provide apparatus and methods for using augmented and/or virtual reality to authenticate a proxy based on actions performed by the proxy while using the augmented/virtual reality.

SUMMARY OF THE DISCLOSURE

Systems, methods and apparatus for providing a password using augmented and/or virtual reality are provided. Systems, methods and apparatus for authenticating one or more of a transaction and a proxy are provided.

The apparatus may include an electronic transaction authentication system for authenticating a proxy on behalf of a customer.

The authentication system may include a financial institution platform. The financial institution platform may receive from a customer one or more of a voice recording, a customer bank account number, two or more physical features of the proxy, two or more actions for being performing by the proxy in a virtual reality environment, and an amount of funds to be withdrawn from the customer bank account and transferred to the proxy.

The authentication system may include a scanner including facial recognition technology for scanning at least a portion of a physical form of the proxy. The authentication system may include a virtual reality headset for displaying to the proxy the virtual reality environment and tracking the proxy's actions in the virtual reality environment.

The authentication system may include a financial transaction engine including a set of processors for determining if the scanned physical form of the proxy includes the two or more features and determining if the proxy's actions in the virtual reality environment included the two or more actions. The two or more processors may be configured to authenticate the proxy and instruct an audio player for playing the voice recording to the proxy if the physical form includes the two or more features and the proxy's actions include the two or more actions.

The authentication system may include the audio player for playing the voice recording to the proxy.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows an illustrative graphical user interface in accordance with the invention;

DETAILED DESCRIPTION

Figure 1:
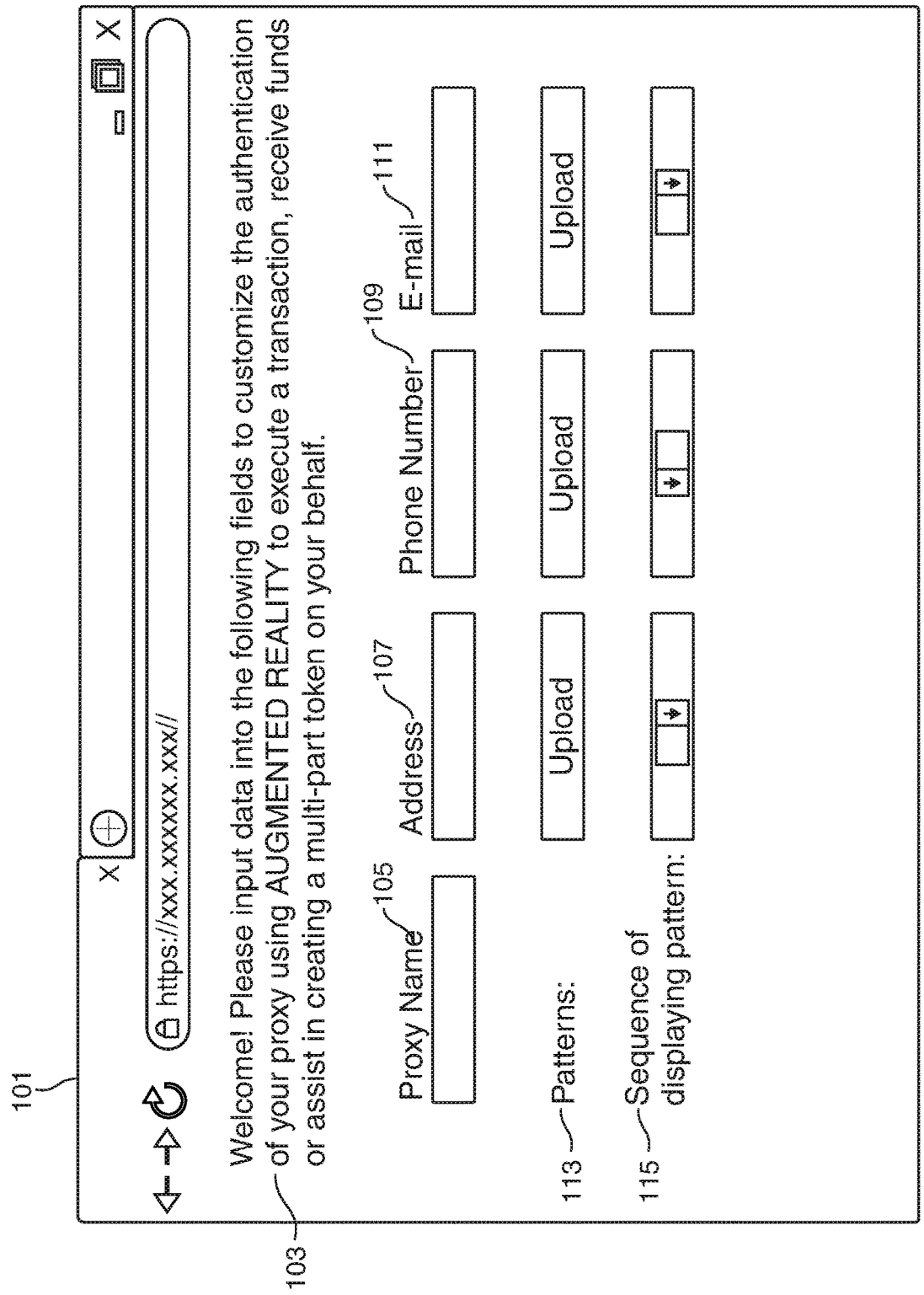
FIG. 1 shows an illustrative graphical user interface in accordance with the invention.

Apparatus and methods for using augmented and/or virtual reality for authentication purpose are provided.

The apparatus and methods of the invention may include an electronic transaction authentication system. The electronic transaction authentication system may be used to authenticate a proxy on behalf of a customer.

The criteria for authenticating the proxy may be based on criteria such as patterns displayed on a three-dimensional object presented to a camera and a sequence of displaying the patterns to the camera, physical features of the proxy and/or actions taken by the proxy in a virtual reality environment.

The criteria are described herein as being selected by a customer different from the proxy. In other embodiments, a financial institution may set the predetermined criteria. In these embodiments, the criteria be a pre-set password. In yet other embodiments, the proxy himself may select the criteria to be used to authenticate himself. In these embodiments, the criteria be a user-selected password and the proxy and the customer may be the same individual.

It should be understood that, in the application, the term proxy relates to an individual that is being authenticated using the augmented/virtual reality systems and methods described herein. The proxy, as described herein, may or may not carry out one or more actions on behalf of a different individual after his authentication using the augmented/virtual reality systems and methods.

The authentication system may include a financial institution platform for receiving, from a customer, one or more of a voice recording, a customer bank account number, two or more physical features of the proxy, two or more actions for being performing by the proxy in a virtual reality environment, and/or an amount of funds to be withdrawn from the customer bank account and transferred to the proxy. The two or more actions may be performed by the proxy by manipulating an avatar displayed to the proxy on a virtual reality headset.

The financial institution platform may include two more processors. The financial institution platform may include a graphical user interface. The customer may upload data to the graphical user interface. The graphical user interface may be presented on a financial institution's baking website or any other suitable website. The customer may update data that defines his proxy and assists in the identification of his proxy at a remote location.

The customer may subsequently communicate to his proxy the two or more actions that customer selected for being performed in the virtual reality environment. This may enable the customer to create his own means for his proxy's identification and enable him to communicate the virtual reality actions to the proxy in whichever method he feels most secure. This also gives the customer greater involvement in his proxy's authentication process.

In some embodiments, once the proxy has been authenticated, the proxy may be given certain permissions, passwords, funds, etc. The proxy may then use these permissions, passwords and/or funds to execute actions on behalf of the customer. In exemplary embodiments, the customer may request the proxy to execute a financial transaction on his behalf. In additional exemplary embodiments, the customer may request the proxy to transfer money to a third party on his behalf.

The two or more physical features may be selected from a group comprising hair color, height, eye color, weight and/or any other suitable physical feature. The two or more actions may be selected from a group including grabbing an object, lifting up an object, throwing an object, placing an object in a basket, jumping, rolling, sitting, lying down and flying, smashing, shooting, eating, putting on a piece of clothing, walking, running, building, and any other action that may be performed in a virtual reality environment.

The authentication system may include a scanner including facial recognition technology for scanning at least a portion of a physical form of the proxy. The scanner may transmit the scanned data to a financial transaction engine.

In some embodiments, the virtual reality environment may prompt the proxy to create an avatar having his own personal physical features. The physical features that the proxy is prompted to select for his avatar may include at least the two or more physical feature of the proxy input by the customer into the financial institution platform. The proxy may be prompted to select for his avatar features that match his own personal features.

For example, if a user input into the platform that the proxy has blonde hair and green eyes, the proxy may be prompted to select the hair color and eye color of his avatar. If the proxy does not select an avatar having blonde hair and green eyes, the two features input by the customer into the platform, the proxy may not be authenticated by the authentication system. In some of these embodiments the authentication system may include the scanner and authentication steps associated with the scanner. In some of these embodiments the authentication system may not include the scanner and the authentication steps associated with the scanner.

The authentication system may include the virtual reality headset for displaying to the proxy the virtual reality environment and for tracking the proxy's actions in the virtual reality environment. The proxy may perform actions in the virtual reality environment by manipulating an avatar. The virtual reality headset may transmit data relating to the proxy's actions in the virtual reality environment to the financial transaction engine.

The virtual reality headset may display the avatar within the virtual reality environment. The avatar may include the two or more physical features of the proxy. The avatar may include two or more physical features of the customer.

The authentication system may include the financial transaction engine including a set of processors. The set of processors may determine if the scanned physical form of the proxy includes the two or more features and determining if the proxy's actions in the virtual reality environment are included the two or more actions. The proxy's actions in the virtual environment may be performed by the avatar.

In some embodiments, if the proxy performs an action in the virtual reality environment that is not included in the two or more actions, the set of processors may decline to authenticate the proxy.

In some embodiments, the proxy may execute a first set of actions not within the two or more actions that will not result in the proxy's not being authenticated to the system, such as simply moving the avatar through the virtual reality environment, opening doors, looking through windows, etc. However, the proxy may execute a second set of actions that are not included in the two or more actions that, when executed, will result in the proxy's not being authenticated to the system, such as the avatar picking up a coin, building or destroying something, or executing any other similar action that modifies a state of objects within the virtual reality environment.

In the event that that the physical form includes the two or more features and the proxy's actions include the two or more actions, the set of processors may authenticate the proxy. In some embodiments, the customer may not upload features of the proxy to the database. In these embodiments, the apparatus may not include the scanner and the authentication may not be based on the two or more features.

The two or more processors may transmit to the proxy, after authentication, two or more passwords and/or funds. The two or more processors may update one or more databases to record that the proxy has access permissions or signatory permissions to one or more customer accounts.

The authentication of the proxy by the transaction engine may include authenticating the proxy to execute a financial transaction on behalf of the customer and transferring funds to the proxy from a financial account of the customer.

When the customer is a first customer, the authentication of the proxy by the transaction engine may include authenticating the proxy to execute a financial transaction on behalf of a second customer. The authentication of the proxy may also include transferring funds to the proxy from a financial account of the first customer to execute the transaction on behalf of the second customer.

The authentication of the proxy by the transaction engine may complete a verification step of a transaction, wherein the transaction includes two or more verification steps. The authentication of the proxy by the transaction engine may be a first or intermediate step in a multi-part verification process of a transaction, wherein the transaction includes two or more verification steps.

The authentication of the proxy by the transaction engine may complete a pending transaction. For example, when the proxy is a business executive, the authentication of the proxy/business executive may be the final verification step required to authenticate a large transaction, a business deal, a merger/acquisition, or any other suitable business or financial agreement.

The authentication of the proxy by the transaction engine may include giving the proxy permissions to access a customer bank account. The authentication of the proxy may include updating an electronic signature database to include authorizing the proxy as a signatory of the customer.

In some embodiments, the set of processors may instruct an audio player to play the voice recording in the event that that physical form includes the two or more features and the proxy's actions include the two or more actions.

The authentication system may include the audio player. The audio player may play the voice recording to the proxy. The audio player may be integral to the headset. The audio player may be separate from the headset.

When the customer is a first customer, the voice recording may include instructions from the first customer, to the proxy, regarding the transferring of funds to a second customer or any other instructions or messages. In some embodiments, the avatar displayed by the virtual headset may resemble the first customer. The voice recording may include verbal instructions, from the first customer, to the proxy. The verbal instructions may include instructions regarding actions that the proxy is to perform for the second customer. The verbal instructions may include an authorization code for the proxy to use when executing a transaction for the second customer.

The authentication system may include a printer. The printer may print for the proxy a transcript of the voice recording after the audio player has finished playing the voice recording.

The financial transaction engine may withdraw the amount of funds from the customer bank account and transfer the funds to the proxy after instructing the audio player to play the voice recording. The customer may be a first customer. The proxy may use the funds to execute one or more transactions for a second customer in accordance with the first customer's request in the voice recording.

The authentication system may include a biometrics sensor. The financial institution may receive from the customer biometric data. The biometrics sensor may receive biometric data from the proxy. The second set of processors may determine if biometric data received from the biometric sensor matches the biometric data received from the customer. If the data does not match, the two or more processors may not authenticate the proxy. If the data does match, and the remaining authentication conditions are met, the two or more processors may authenticate the proxy.

In some embodiments, the financial institution platform may receive, from the user, an order in which the input two or more actions must be performed within the virtual reality environment. In some of these embodiments, the virtual reality headset may store an order in which the proxy's actions were performed in the virtual reality environment. The set of processors may authenticate the proxy only if the physical form includes the two or more features, the proxy's actions include the two or more actions and the two or more actions are performed in the order input by the user in the financial institution platform.

In some embodiments, the proxy may be provided with a limited time to perform the two or more actions in the virtual reality environment. The virtual reality headset may include a timer that is activated when the proxy begins to interact with the virtual reality environment. When the time hits a predetermined time, such as 1 minute, 2 minutes, 5 minutes, 10 minutes, or any other suitable number of minutes, the proxy's session may be terminated. The set of processors may then proceed to determine whether or not to authenticate the proxy based on the proxy's actions within the virtual reality environment.

The virtual headset may include a geospatial locator. The virtual headset may record a geospatial location at which the proxy's movement was recorded. The platform may receive from the customer one or more geospatial locations. The two or more processors may determine if the location of the headset determined by the geospatial locator is included in the one or more geospatial locations received from the customer. If the geospatial data does not match, the two or more processors may not authenticate the proxy. If the geospatial data does match, and the remaining authentication conditions are met, the two or more processors may authenticate the proxy.

The virtual headset may append a timestamp to the actions performed by the proxy in the virtual reality environment. The platform may receive from the customer a time range. The two or more processors may determine if the timestamp is included in the time range. If the timestamp is not included in the time range, the two or more processors may not authenticate the proxy. If the timestamp is included in the time range, and the remaining authentication conditions are met, the two or more processors may authenticate the proxy.

The virtual headset may include a sensor. The sensor may determine the wavelength and frequency of light exposed to the sensor. The headset may transmit to the two or more processors data detailing frequency, or range of frequencies, of light exposed to the sensor. The two or more processors may store predetermined values for acceptable light frequencies for being exposed to the sensor. If the received data is not within the predetermined values, the two or more processors may not authenticate the proxy.

The virtual reality headset may be used in a control room that is lit with light having a set range of frequencies. If the two or more processors determine that the virtual reality headset was exposed to light having frequencies outside the set range, the proxy may not be authenticated. This may add an additional layer of security by ensuring that the data is being generated in control room and not in a different, unsecured location.

The virtual reality headset may be used in a bank in which the lights is within a set range of frequencies. If the two or more processors determine that the headset was exposed to light outside of the set range, the proxy may not be authenticated.

In some embodiments, two or more processors may generate a first token in response to the authentication of the proxy's two or more actions and two or more features. The two or more processors may generate a second token in response to the determining of the geospatial location of the virtual headset. The first and second token, combined, may together form a one-time token that gives the proxy authentication to perform a transaction, make a payment, receive a payment, or perform any other suitable action.

The one-time token may also include one or more additional or alternate tokens generated by the two or more processors in response to one, two, more, or each of the authentication of the proxy based on the biometric data, the timestamp, the light exposed to the sensor, the time within which the proxy's actions in the virtual reality environment were performed, or any other suitable authentication step(s) described herein.

The apparatus and methods of the invention may include an authentication system including a financial institution platform for receiving, from a customer, two or more physical features of two or more proxies and two or more actions for being performing by each of the two or more proxies in a virtual reality environment. The apparatus may include the scanner, virtual reality headset and the financial transaction engine including the set of processors.

Each of the proxies may be assigned actions by the customer for executing in the virtual reality environment. The authentication of each proxy may be performed as set forth above when detailing the authentication of a single proxy by the financial transaction engine including the set of processors.

The avatar presented to each proxy may include physical features of the proxy input, by the customer, into the financial institution platform. In some embodiments, the customer may select a sequence for which proxy must be authenticated first, which one second, etc. In some of these embodiments, the virtual reality environment displayed to each proxy after the first proxy may be the environment last displayed to the most previous proxy that was authenticated.

In some embodiments, the virtual reality environment may display different data to each proxy. In some embodiments, a first proxy may be displayed an authentication page and a second proxy may be displayed an authorization page. In some embodiments, a first proxy may be shown a first set of instructions, a second proxy may be shown a second set of instructions, etc. This may assist in providing each proxy with only the data that each proxy need to know when the transaction at issues involves multiple, discrete steps that need to be performed by different individuals.

The authentication of each proxy may create a token. The token may be part of a multi-part token. When each proxy in the group of proxies has been authenticated, all the tokens of the multi-part token may be generated and the multi-part token may be complete. Generation of all the tokens included in the multi-part token may trigger a financial transaction such as the transfer of funds, the closing of a business deal, or the start or completion of any other suitable business or financial agreement.

Each token may be assigned a weight. The weight of each token may be based at last in part on the proxy's location within a hierarchy of a business. The larger the weight of the token, the more importance the token has within the multi-part token. For example, a C.E.O.'s token may have a much greater weight than a token created by a clerk.

The apparatus and methods of the invention may include an electronic transaction authentication system for authenticating a proxy on behalf of a customer.

The authentication system may include a first set of processors for receiving from the customer a first two-dimensional pattern, a second two-dimensional pattern, a third two-dimensional pattern and a sequence for presenting the first, second and third pattern. The patterns may include lines, shapes, pictures, and/or any other suitable markings or drawings. An exemplary sequence is presenting a first of the faces first, a second of the faces second, and a third of the faces third, or in any other order.

The first set of processors may include a graphical user interface. The customer may upload the patterns via a graphical user interface. The graphical user interface may be presented on a financial institution's baking website or any other suitable website.

The user may transmit the patterns to the proxy to enable the proxy to authenticate himself at a financial institution or any other institution. This enables the customer to participate in his proxy's authentication, giving the customer greater involvement in his proxy's authentication process. The customer's selection and uploading of the patterns and the sequence enables the customer to create his own means for his proxy's identification and enables him to communicate the data to the proxy in whichever method he feels most secure.

Once the proxy has been authenticated, the proxy may be given certain permissions, passwords, funds, etc. The proxy may then use these permissions, passwords and/or funds to execute actions on behalf of the user. In exemplary embodiments, the user may request the proxy to execute a financial transaction on his behalf. In additional exemplary embodiments, the user may request the proxy to transfer money to a third party on his behalf.

The authentication system may include a camera operable to record the proxy's movement of an object in space. The object may be a cube, a sphere, a rhombus, or any other suitable three-dimensional object.

The camera may extract, from the recording, a first face of the object presented to the camera, a second face of the object presented to the camera and a third face of the object presented to the camera. The camera may record a sequence in which the faces were presented to the camera.

The authentication system may include a financial transaction engine including a second set of processors for receiving data from the first set of processors and the camera and determining if each of the first, second and third face includes one of the first, second and third patterns.

If each of the first, second and third faces includes one of the first, second and third patterns, the second set of processors may determine if faces were presented to the camera in the sequence received from the first processor.

If each of the first, second and third faces include one of the first, second and third patterns, and if faces were presented to the camera in the sequence received from the first processor, the second set of processors may authenticate the proxy.

The second set of processors may decline to authenticate the proxy if one or more of the first, second and third faces include a pattern different from the first, second and third patterns. The second set of processors may decline to authenticate the proxy if faces were not presented to the camera in the sequence received from the first processor.

The authentication of the proxy by the transaction engine may include authenticating the proxy to execute a financial transaction on behalf of the customer and transferring funds to the proxy from a financial account of the customer.

When the customer is a first customer, the authentication of the proxy by the transaction engine may include authenticating the proxy to execute a financial transaction on behalf of a second customer. The authentication of the proxy may also include transferring funds to the proxy from a financial account of the first customer to execute the transaction on behalf of the second customer.

The authentication of the proxy by the transaction engine may complete a verification step of a transaction, wherein the transaction includes two or more verification steps. The authentication of the proxy by the transaction engine may be a first or intermediate step in a multi-part verification process of a transaction, wherein the transaction includes two or more verification steps.

The authentication of the proxy by the transaction engine may complete a pending transaction. For example, when the proxy is a business executive, the authentication of the proxy/business executive may be the final verification step required to authenticate a large transaction, a business deal, a merger/acquisition, or any other suitable business or financial agreement.

The authentication of the proxy by the transaction engine may include giving the proxy permissions to access a customer bank account. The authentication of the proxy may include updating an electronic signature database to include authorizing the proxy as a signatory of the customer.

The authentication system may include a biometrics sensor. The first set of processors may receive the customer biometric data. The biometrics sensor may receive biometric data from the proxy. The second set of processors may determine if biometric data received from the biometric sensor matches the biometric data received from the customer. If the biometric data matches, and the faces and sequence were determined to match, the second set of processors may authenticate the proxy. In the event that biometric data received from the biometric sensor does not match the biometric data received from the customer, the second set of processors may decline to authenticate the proxy.

The authentication system may include a scanner including facial recognition technology. The first set of processors may receive from the customer a photograph of the proxy. The scanner may scan the face of the proxy. The second set of processors may determine if data received by the scanner correlates to the photograph received from the customer. If the scanned data correlates to the photograph, and the faces and sequence were determined to match, the second set of processors may authenticate the proxy. If the data received by the scanner does not correlate to the photograph received from the customer, the second set of processors may decline to authenticate the proxy.

The camera may include a geospatial locator. The camera may record a geospatial location at which the proxy's movement was recorded. The first set of processors may receive from the customer one or more geospatial locations. The second set of processors may determine if the location of the camera determined by the geospatial locator is included in the one or more geospatial locations received from the customer. If the geospatial locator is included in the one or more geospatial locations, and the faces and sequence were determined to match, the second set of processors may authenticate the proxy. If the location of the camera determined by the geospatial locator is not included in the one or more geospatial locations received from the customer, the second set of processors may decline to authenticate the proxy.

The camera may append a timestamp to the recorded data. The first set of processors may receive from the customer a time range. The second set of processors may determine if timestamp is included in the time range. If the timestamp is included in the time range, the second set of processors may authenticate the proxy. If the timestamp is not included in the time range, the second set of processors may decline to authenticate the proxy.

The second set of processors, after the authentication of the proxy, may generate a token. The token may be part of a multi-part token. The multi-part token may be used to authenticate a transaction.

The first set of processors may receive from the customer two or more first, second and third two-dimensional patterns. Each set of first, second and third patterns may be associated with authenticating one proxy included in a group of two or more proxies. The first set of processors may also receive from the customer a sequence for presenting each set of first, second and third patterns. The customer may upload the patterns via the graphical user interface. The graphical user interface may be presented on a financial institution's baking website or any other suitable website. The customer may also input data identifying each of the proxies included in the group of two or more proxies.

Each proxy may present to the camera a three-dimensional object. The authentication of each proxy may be performed as set forth above when discussing the authentication of a single proxy by the second set of processors.

The authentication of each proxy may create a token. The token may be part of a multi-part token. When each proxy in the group of proxies has been authenticated, all the tokens of the multi-part token may be generated. Generation of all the tokens included in the multi-part token may effectuate a financial transaction such as the transfer of funds, close a business deal, or complete any other suitable business or financial agreement.

Each token may be assigned a weight. The weight of the token may relate to the location of the proxy in the hierarchy of a business. The larger the weight of the token, the more importance the token has within the multi-part token. For example, a C.E.O.'s token may have a much greater weight than a token created by a clerk.

The apparatus and methods of the invention may include a method for authenticating a proxy for executing a transaction on behalf of a customer. The authentication may be based on the movement of a three-dimensional object in space. The object may have a plurality of faces. The movement of the object may be tracked by a camera.

The method may include receiving, from a first set of processors, a first two-dimensional pattern, a second two-dimensional pattern, a third two-dimensional pattern and a sequence for presenting the first, second and third pattern.

The method may include tracking, using a camera, the movement of the object in space. The method may also include capturing, using the camera, a first face of the object presented to the camera, a second face of the object presented to the camera and a third face of the object presented to the camera. The method may further include recording, using the camera, a sequence in which the faces were presented to the camera.

The method may include transmitting data from each of the first set of processors and the camera to a second set of processors. The method may also include determining, using the second set of processors, if each of the first, second and third face includes one of the first, second and third patterns. The method may further include determining if the sequence recorded by the camera is equal to the sequence received from the first processors.

If each of the first, second and third faces include one of the first, second and third patterns, and if the sequence recorded by the camera is equal to the sequence received from the first processor, the method may include using the second set of processors to authenticate the proxy for executing the transaction on behalf of the customer.

The method may also include using the second set of processors to decline to authenticate the proxy if one or more of the first, second and third faces include a pattern different from the first, second and third patterns. The method may further include using the second set of processors to decline to authenticate the proxy if the sequence recorded by the camera is different from the sequence received from the first processor.

The apparatus and methods of the invention may include an authentication system including a combination of the augmented and virtual reality systems and methods described herein.

For example, a customer may upload on a graphical user interface the first, second and third faces, the pattern, and also features of the proxy and/or actions to be performed by the proxy in a virtual reality environment.

The authentication system may include the camera, the scanner, the virtual reality headset, the audio player, and the financial transaction engine. The authentication system may perform the functions described above in authenticating the pattern and sequence of the faces and in authenticating the physical form of the proxy and the actions of the proxy in the virtual reality environment. The authentication system may include a set of processors for authenticating the faces and sequence of the three-dimensional object and for authenticating the physical form of the proxy and the actions of the proxy in the virtual reality environment. The authentication system may some or all of the apparatus and methods described above.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative graphical user interface 101. Illustrative graphical user interface 101 may include welcome text 103. Illustrative graphical user interface 101 may also include data input fields for inputting a proxy's personal data, such as Proxy Name 105, Address 107, Phone Number 109 and E-mail 111.

The user may also be presented with the option of uploading different patterns at Patterns 113. The patterns may be later presented to the camera of the electronic transaction authentication system by the proxy. The user may be responsible for transmitting the patterns to the proxy. The graphical user display may include text stating "add more Patterns" (not shown) enabling the user to upload more than three patterns. The user may also select a sequence for displaying the patterns using Sequence of displaying pattern 115. Each drop-down box may include the numbers 1-3, 1-6, 1-8, or any other suitable range of numbers. This may allow the user to select a sequence for displaying the patterns to the camera.

FIG. 2 shows illustrative graphical user interface 201. Illustrative graphical user interface 201 may include welcome text 201. Illustrative graphical user interface 201 may also include data input fields 205 for inputting a proxy's personal data. Illustrative graphical user interface 201 may also include actions 207 for the proxy to perform in a virtual reality environment. Illustrative graphical user interface 201 may also include order 209 in which the proxy must execute the selected actions. Order 209 may be optional. In other embodiments, a user may simply select two or more actions for the proxy to perform in the virtual environment without specifying the order in which the two or more actions must be performed.

Figure 3:
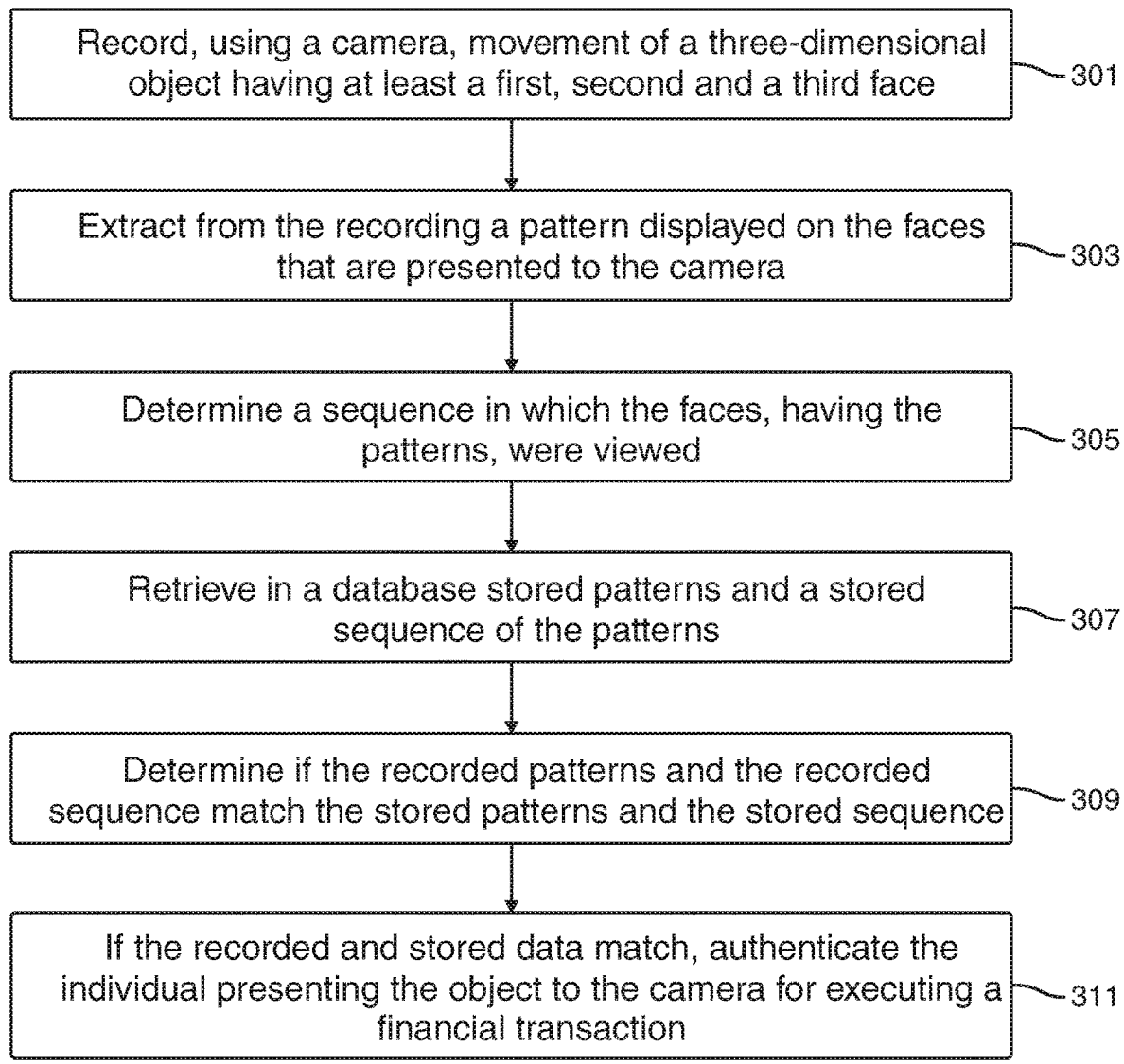
FIG. 3 shows steps of an illustrative process in accordance with the invention.

FIG. 3 shows an illustrative process for performing in accordance with the apparatus and methods of the invention. At step 301, the process may include recording, using a camera, movement of a three-dimensional object having at least a first, second and a third face. At step 303 the process may include extracting from the recording a pattern displayed on the faces that are presented to the camera. At step 305 the process may include determining a sequence in which the faces, having the patterns, were viewed. At step 307 the process may include retrieving in a database stored patterns and a stored sequence of the patterns. At step 309 the process may include determining if the recorded patterns and the recorded sequence match the stored patterns and the stored sequence. At step 311 the process may include, if the recorded and stored data match, authenticating the individual presenting the object to the camera for executing a financial transaction.

Figure 4:
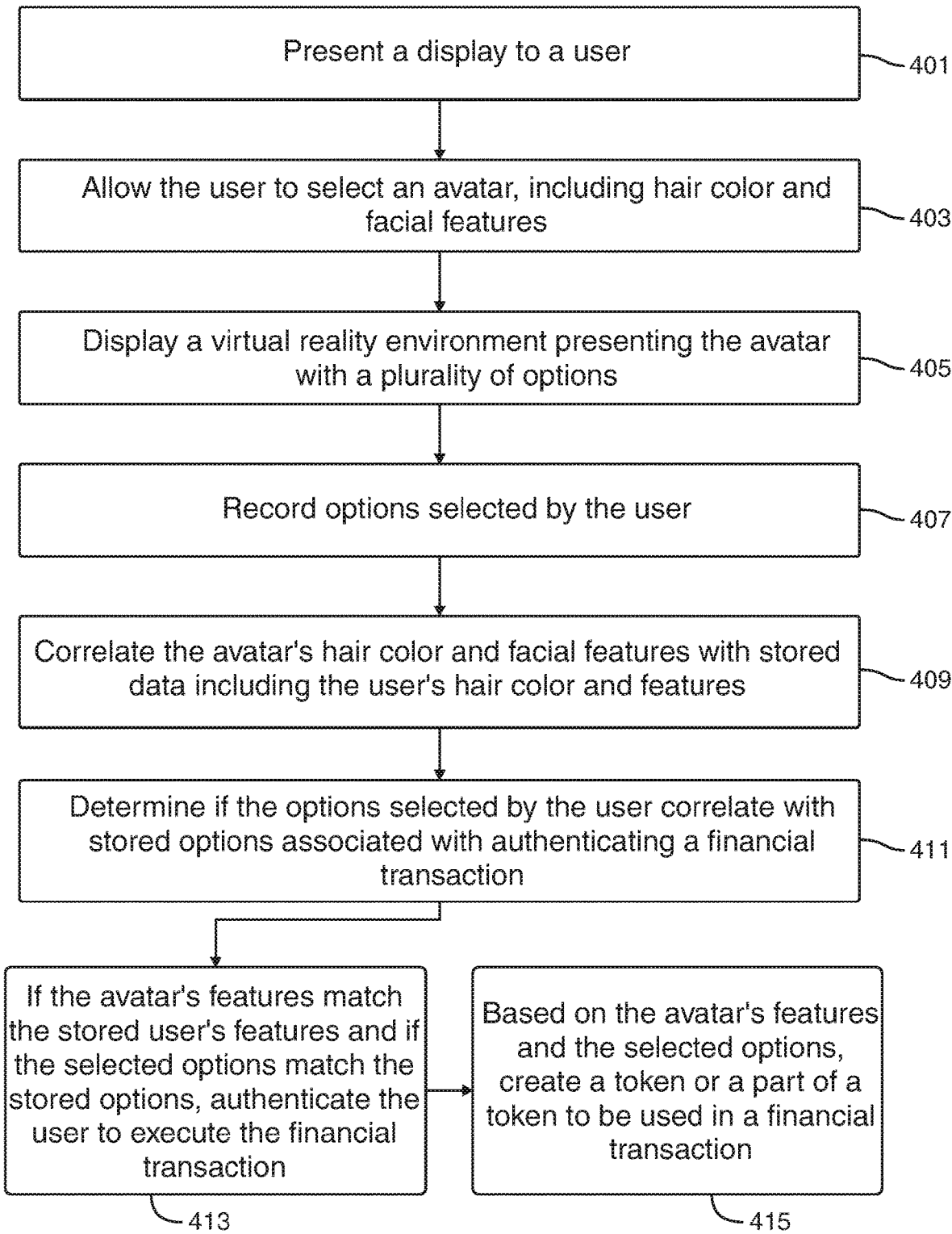
FIG. 4 shows steps of an illustrative process in accordance with the invention.

FIG. 4 shows an illustrative process for performing in accordance with the apparatus and methods of the invention. At step 401 the process may include presenting a display to a user. At step 403 that process may include allowing the user to select an avatar, including hair color and facial features. At step 405 the process may include displaying display a virtual reality environment presenting the avatar with a plurality of options. At step 407 the process may include recording options selected by the user. At step 409 the process may include correlating the avatar's hair color and facial features with stored data including the user's hair color and features. At step 411 the process may include determining if the options selected by the user are equivalent with stored options associated with authenticating a financial transaction. At step 413 the process may include, if the avatar's features match the stored user's features and if the selected options match the stored options, authenticating the user to execute the financial transaction. At step 415 the process may include, based on the avatar's features and the selected options, creating a token or a part of a token to be used in a financial transaction.

Thus, systems and methods for remote authentication of a proxy have been provided. Persons skilled in the art will appreciate that the present invention can be practiced by other than the described embodiments, which are presented for purposes of illustration rather than of limitation.

What is claimed is:

1. An electronic transaction authentication system for authenticating a proxy to execute a financial transaction on behalf of a customer, the system comprising:
- a financial institution platform for receiving, from the customer, the customer being different from the proxy, a voice recording, a customer bank account number, two or more physical features of the proxy, two or more actions for being performing by the proxy in a virtual reality environment, and an amount of funds to be withdrawn from the customer bank account and transferred to the proxy;
- a scanner including facial recognition technology for scanning at least a portion of a physical form of the proxy and transmitting the scanned data to a financial transaction engine;
- a virtual reality headset for:
  - displaying to the proxy the virtual reality environment;
  - tracking the proxy's actions in the virtual reality environment; and
  - transmitting the tracked data to the financial transaction engine;
- the financial transaction engine including a set of processors for:
  - determining if the scanned physical form of the proxy includes the two or more physical features;
  - determining if the proxy's actions in the virtual reality environment included the two or more actions; and
  - if the scanned physical form includes the two or more features and the proxy's actions include the two or more actions, authenticating the proxy and instructing an audio player for playing the voice recording to the proxy;
- the audio player for playing the voice recording to the proxy; and
- the financial transaction engine for, after the authenticating the proxy:
  - updating one or more databases to record that the proxy has access permissions to one or more customer bank accounts of the customer;
  - authenticating the proxy to execute a financial transaction on behalf of the customer; and
  - withdrawing the amount of funds from the customer bank account and transferring the funds to the proxy after instructing the audio player to play the voice recording.

2. The authentication system of claim 1 wherein, when the customer is a first customer, the voice recording includes instructions to the proxy to transfer the funds to a second customer.

3. The authentication system of claim 1 wherein the virtual reality headset is further configured to display an avatar within the virtual reality environment.

4. The authentication system of claim 3 wherein the avatar includes the two or more physical features.

5. The authentication system of claim 1 further comprising a biometrics sensor wherein:
- the financial institution platform is further configured to receive biometric data from the customer;
- the biometrics sensor is configured to receive biometric data from the proxy; and
- the second set of processors is configured to determine if the biometric data received from the biometric sensor matches the biometric data received from the customer.

6. The authentication system of claim 1 wherein the two or more actions are selected from a group comprising grabbing an object, lifting up an object, throwing an object, placing an object in a basket, jumping, rolling, sitting, lying down and flying.

7. The authentication system of claim 1 further comprising a printer for printing to the proxy a transcript of the voice recording after the audio player has finished playing the voice recording.

8. The authentication system of claim 1 wherein the two or more physical features are selected from a group comprising hair color, height, eye color and weight.

9. An electronic transaction authentication system for authenticating a proxy to execute a financial transaction on behalf of a customer, the system comprising:
- a first set of processors for receiving from the customer, the customer being different from the proxy, a first two-dimensional pattern, a second two-dimensional pattern, a third two-dimensional pattern and a sequence for presenting the first, second and third pattern;
- a camera operable to:
  - record the proxy's movement of an object in space;
  - extract, from the recording, a first face of the object presented to the camera, a second face of the object presented to the camera and a third face of the object presented to the camera; and
  - record a sequence in which the faces were presented to the camera;
- a financial transaction engine including a second set of processors for:
  - receiving data from the first set of processors and the camera;
  - determining if each of the first, second and third face includes one of the first, second and third patterns;
  - if each of the first, second and third faces includes one of the first, second and third patterns, determining if faces were presented to the camera in the sequence received from the first processor;
  - if each of the first, second and third faces include one of the first, second and third patterns, and if faces were presented to the camera in the sequence received from the first processor, authenticating the proxy, the authenticating the proxy including authenticating the proxy to execute a financial transaction on behalf of the customer, updating one or more databases to record that the proxy has access permissions to one or more customer bank accounts of the customer, and transferring funds to the proxy from a financial account of the customer;
  - declining to authenticate the proxy if one or more of the first, second and third faces include a pattern different from the first, second and third patterns; and
  - declining to authenticate the proxy if faces were not presented to the camera in the sequence received from the first processor.

10. The authentication system of claim 9 wherein, when the customer is a first customer, the authenticating of the proxy by the transaction engine includes authenticating the proxy to execute a financial transaction on behalf of a second customer and transferring funds to the proxy from a financial account of the first customer to execute the transaction on behalf of the second customer.

11. The authentication system of claim 9 wherein the authenticating of the proxy by the transaction engine completes a verification step of a transaction, wherein the transaction includes two or more verification steps.

12. The authentication system of claim 9 wherein the authenticating of the proxy by the transaction engine completes a pending transaction.

13. The authentication system of claim 9 wherein the authenticating of the proxy by the transaction engine includes giving the proxy permissions to access a customer bank account and updating an electronic signature database to include authorizing the proxy as a signatory of the customer.

14. The authentication system of claim 9 further comprising a biometrics sensor wherein:
the first set of processors is further configured to receive first biometric data from the customer;
the biometrics sensor is configured to receive second biometric data from the proxy; and
the second set of processors is configured to:
determine if the second biometric data received from the biometric sensor matches the first biometric data received from the customer; and
if the second biometric data received from the biometric sensor does not match the first biometric data received from the customer, declining to authenticate the proxy.

15. The authentication system of claim 9 further comprising a scanner including facial recognition technology wherein:
the first set of processors is further configured to receive from the customer a photograph of the proxy;
the scanner is configured to scan a face of the proxy; and
the second set of processors is further configured to:
determine if data received by the scanner correlates to the photograph received from the customer; and
if the data received by the scanner does not correlate to the photograph received from the customer, declining to authenticate the proxy.

16. The authentication system of claim 9 wherein:
the camera includes a geospatial locator and is configured to record a geospatial location at which the proxy's movement was recorded;
the first set of processors is further configured to receive from the customer one or more geospatial locations;
the second set of processors is further configured to:
determine if the location of the camera determined by the geospatial locator is included in the one or more geospatial locations received from the customer; and
if the location of the camera determined by the geospatial locator is not included in the one or more geospatial locations received from the customer, declining to authenticate the proxy.

17. The authentication system of claim 9 wherein:
the camera is further configured to append a timestamp to the recorded data;
the first set of processors is further configured to receive from the customer a time range;
the second set of processors is further configured to:
determine if the timestamp is included in the time range; and
if the timestamp is not included in the time range, declining to authenticate the proxy.

18. The authentication system of claim 9 wherein the second set of processors is further configured to, after the authentication of the proxy, generate a token that is part of a multi-part token, the multi-part token being used to authenticate a transaction.

19. A method for authenticating a proxy for executing a transaction on behalf of a customer, the authentication being based on a movement of a three-dimensional object in space, the object having a plurality of faces, the movement being tracked by a camera, the method comprising:
receiving data from a first set of processors, the data including a first two-dimensional pattern, a second two-dimensional pattern, a third two-dimensional pattern and a sequence for presenting the first, second and third pattern, the data being received from the customer;
tracking, using the camera, the movement of the object in space;
capturing, using the camera, a first face of the object presented to the camera, a second face of the object presented to the camera and a third face of the object presented to the camera;
recording, using the camera, a sequence in which the faces were presented to the camera;
transmitting the data from each of the first set of processors and the camera to a second set of processors;
determining, using the second set of processors, if each of the first, second and third face includes one of the first, second and third patterns;
determining if the sequence recorded by the camera is equal to the sequence received from the first processor;
if each of the first, second and third faces include one of the first, second and third patterns, and if the sequence recorded by the camera is equal to the sequence received from the first processor, using the second set of processors to authenticate the proxy for executing the transaction on behalf of the customer and update one or more databases to record that the proxy has access permissions to one or more customer bank accounts of the customer, the customer being an individual different from the proxy;
using the second set of processors to decline to authenticate the proxy if one or more of the first, second and third faces include a pattern different from the first, second and third patterns; and
using the second set of processors to decline to authenticate the proxy if the sequence recorded by the camera is different from the sequence received from the first set of processors.

* * * * *